(No Model.)
S. A. TROWBRIDGE & C. E. TWITT.
CLUTCH.
No. 505,545. Patented Sept. 26, 1893.
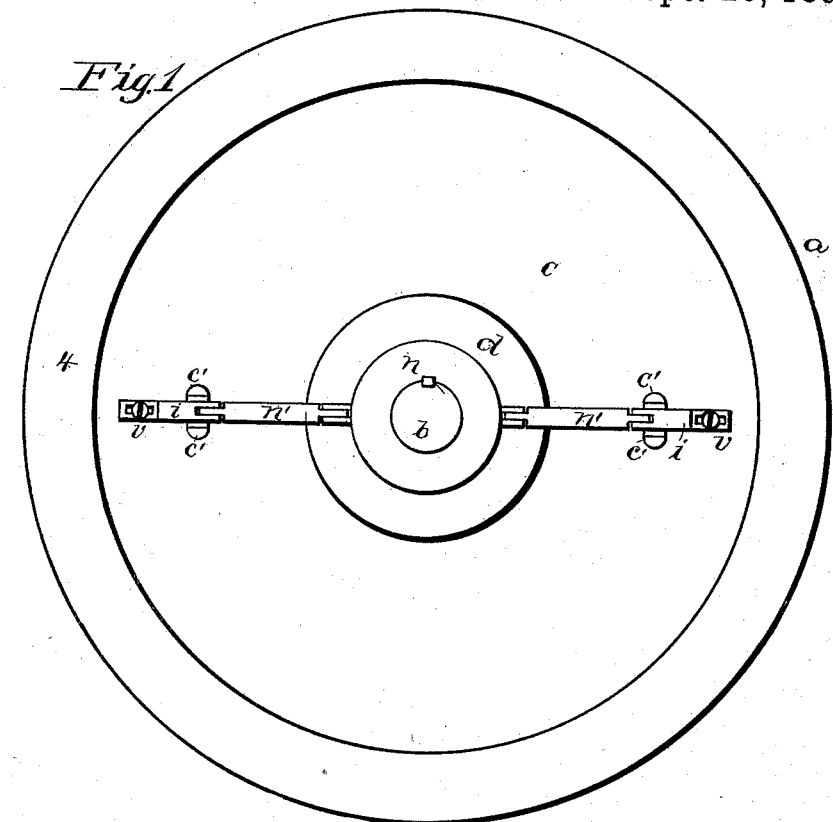
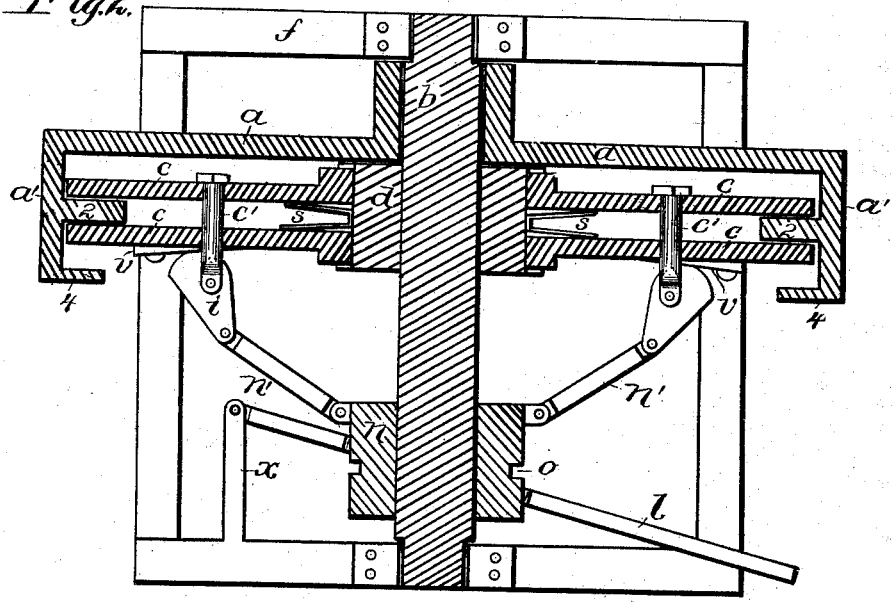
Witnesses—
C. S. Olmstead
H. B. Dickinson.
Inventors.
Stephen A. Trowbridge
Charles E. Twitt
By Bradford Howland, Atty.

UNITED STATES PATENT OFFICE.

STEPHEN A. TROWBRIDGE AND CHARLES E. TWITT, OF RAVENNA, OHIO.

CLUTCH.

SPECIFICATION forming part of Letters Patent No. 505,545, dated September 26, 1893.

Application filed October 28, 1892. Serial No. 450,297. (No model.)

*To all whom it may concern:*

Be it known that we, STEPHEN A. TROWBRIDGE and CHARLES E. TWITT, both of Ravenna, Portage county, Ohio, have invented a new and useful Improvement in Clutches, of which the following is a specification.

In the drawings forming a part hereof, Figure 1 represents a face view of the clutch, and Fig. 2, is a longitudinal section of the same.

The wheel $a$ is loose on shaft $b$ and formed with a rim $a'$. The inner side of the rim is formed with circumferential flanges 2 and 4, at right angles to shaft $b$. Hub $d$ is keyed on shaft $b$. Disks or grippers $c\ c$ are feathered on hub $d$ to permit their movement toward and from each other in clutching and releasing flange 2. Such movement of grippers $c\ c$ is effected by means of bolts $c'\ c'$, cams $i\ i$, links $n'$, and sliding collar $n$ which is feathered on the shaft and operated by lever $l$ hinged to arm $x$ of frame $f$. Lever $l$ is formed with a yoked portion around collar $n$ and provided with pins or studs which enter groove $o$ at opposite sides of the collar. There should be a bar or bolt $c'$ at each side of cam $i$ and extending through grippers $c\ c$.

In operating the clutch, lever $l$ and sliding collar $n$ are to be moved toward hub $d$ until link $n'$ is radial to shaft $b$, thereby turning cam $i$ to force grippers $c\ c$ against the sides of flange 2 with sufficient pressure to turn wheel $a$. By reversing this movement of collar $n$, flange 2 is released from the pressure. To prevent either of grippers $c\ c$ from casually touching flange 2 when so released, each of the grippers is provided with a spring $s$ connecting hub $d$ and the grippers to press the latter away from the flange.

It is not essential that grippers $c$ should be disks but it is preferable for the purpose of having greater wearing surface in contact.

By the pressure against flange 2, instead of against the rim of the wheel, the rim is less heated by friction.

The purpose of flange 4 is to retain water in contact with the inner side of the wheel rim and thereby lessen the heat of the rim from friction.

It is obvious that the grippers may be feathered directly on the shaft without the intervention of the hub. In fact the hub may be considered as a part of the shaft.

The wedge $v$ is adjustably attached to grippers $c$ between it and cam $i$ as a wearing plate for the cam to turn on and also for the relative adjustment of the cam and grippers.

We claim as our invention—

1. The combination of a shaft; grippers; cams and sliding collar, adapted to rotate with each other springs to move said grippers; adjustable wedges between said cams and grippers; a loose wheel on said shaft, formed with a flange extending between said grippers,—said collar, cams, and grippers being connected and arranged to cause the latter to clutch and release said flange.

2. The combination of shaft $b$; loose wheel $a$ formed with flanges 2 and 4 at right angles to said shaft; flange 2 being intermediate flange 4 and the web of wheel $a$, sliding collar $n$ and grippers $c$, arranged and adapted to cause the latter to clutch and release flange 2, substantially as described.

STEPHEN A. TROWBRIDGE.
CHARLES E. TWITT.

Witnesses:
BRADFORD HOWLAND,
H. B. DICKINSON.